United States Patent
Langkau (10) Patent No.: US 10,919,381 B2
(45) Date of Patent: Feb. 16, 2021

(54) ACTUATING DEVICE FOR A FILLER-NECK CAP MOVABLY ARRANGED ON A VEHICLE

(71) Applicant: HELLA GmbH & Co. KGaA, Lippstadt (DE)

(72) Inventor: Johannes Langkau, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 165 days.

(21) Appl. No.: 15/991,593

(22) Filed: May 29, 2018

(65) Prior Publication Data

US 2018/0272862 A1 Sep. 27, 2018

Related U.S. Application Data

(63) Continuation of application No. PCT/EP2016/077835, filed on Nov. 16, 2016.

(30) Foreign Application Priority Data

Nov. 27, 2015 (DE) .................. 10 2015 120 597

(51) Int. Cl.
 *B60K 15/05* (2006.01)
 *E05B 83/34* (2014.01)
 *E05C 19/02* (2006.01)
 *E05F 1/10* (2006.01)

(52) U.S. Cl.
 CPC ............ *B60K 15/05* (2013.01); *E05B 83/34* (2013.01); *E05C 19/022* (2013.01); *E05F 1/105* (2013.01); *B60K 2015/053* (2013.01); *B60K 2015/0561* (2013.01); *E05Y 2900/534* (2013.01)

(58) Field of Classification Search
 CPC ............ B60K 15/05; B60K 2015/0561; B60K 2015/053; E05B 83/34; E05Y 2900/534
 USPC ........................................ 296/97.22
 See application file for complete search history.

(56) References Cited

U.S. PATENT DOCUMENTS

| 8,585,119 | B2 | 11/2013 | Beck |
| 9,359,796 | B2* | 6/2016 | Betzen ................ E05B 81/40 |
| 9,493,967 | B2 | 11/2016 | Basavarajappa et al. |
| 10,006,230 | B2* | 6/2018 | Nam .................. E05B 83/34 |
| 10,196,840 | B2* | 2/2019 | Beck .................. B60K 15/05 |

(Continued)

FOREIGN PATENT DOCUMENTS

| DE | 19747707 A1 | 5/1999 |
| DE | 102009060119 A1 | 6/2011 |

(Continued)

*Primary Examiner* — Jason S Morrow
*Assistant Examiner* — E Turner Hicks
(74) *Attorney, Agent, or Firm* — Muncy, Geissler, Olds & Lowe, P.C.

(57) ABSTRACT

An actuating device for a fuel cap, movably arranged on a vehicle, for concealing a tank recess of the vehicle, having: a locking mechanism for locking the fuel cap in a locking state and for unlocking the fuel cap in an unlocking state, and a movably arranged actuating element which is movable by means of an opening movement from a retracted position into an extended position such that the locking mechanism can be brought into the unlocking state by this opening movement of the actuating element, wherein the locking mechanism having a first locking element for arresting the fuel cap and a second locking element for arresting the actuating element.

15 Claims, 6 Drawing Sheets

(56) References Cited

U.S. PATENT DOCUMENTS

| | | | |
|---|---|---|---|
| 10,384,534 B2* | 8/2019 | Guardianelli | E05B 63/22 |
| 10,443,277 B2* | 10/2019 | Basavarajappa | E05C 19/022 |
| 2010/0045049 A1 | 2/2010 | Persiani et al. | |
| 2014/0251036 A1* | 9/2014 | Ishiguro | B60K 15/05 74/55 |

FOREIGN PATENT DOCUMENTS

| | | |
|---|---|---|
| DE | 102011116067 A1 | 1/2013 |
| DE | 102013209355 A1 | 11/2013 |
| KR | 101593118 B1 | 2/2016 |
| WO | WO2013050478 A2 | 4/2013 |

* cited by examiner

ACTUATING DEVICE FOR A FILLER-NECK CAP MOVABLY ARRANGED ON A VEHICLE

This nonprovisional application is a continuation of International Application No. PCT/EP2016/077835, which was filed on Nov. 16, 2016, and which claims priority to German Patent Application No. 10 2015 120 597.1, which was filed in Germany on Nov. 27, 2015, and which are both herein incorporated by reference.

BACKGROUND OF THE INVENTION

Field of the Invention

The present invention relates to an actuating device for a fuel cap movably arranged on a vehicle. Further, the invention relates to a method and an actuation system.

Description of the Background Art

The prior art discloses the use of a mechanical push-push element for a fuel cap of a vehicle, said element being installed in the tank recess to actuate the fuel cap. In order to be able to open the fuel cap completely manually, the push-push element must first be activated by a force or pressure applied to the fuel cap, said element which partially opens the fuel cap by a linear or rotary movement of an electromotive actuator. This partial opening occurs, for example, such that a gap is established between the fuel cap and the vehicle body, said gap which is suitable for allowing an operator to engage behind the fuel cap and for enabling him to fully open it manually. To close the fuel cap, the application of force or pressure to the fuel cap can also be used to close the fuel cap by means of the push-push element. The process described can be repeated subsequently to reopen the fuel cap.

The known push-push elements have the disadvantage, however, that the actuator or the activation mechanism has a high space requirement. A further disadvantage is that for complete locking, that is, the deactivation of the push-push function as well, a separate locking mechanism is often necessary, which increases the complexity and cost of realizing the push-push function. Further, the assembly of known push-push elements has proven to be complicated and inflexible.

SUMMARY OF THE INVENTION

It is therefore an object of the present invention to overcome at least partially the above-described disadvantages. In particular, the object of the invention is to provide an actuating device which allows a more convenient opening, closing, and locking of the fuel cap. In particular, the space required is to be reduced and/or the assembly simplified. Further, the reliability and lifespan for the actuating device is to be increased in particular.

In an exemplary embodiment, the object is achieved in particular by an actuating device for a fuel cap movably arranged on a vehicle for (at least partially) concealing a tank recess of the vehicle, comprising: a locking mechanism for locking the fuel cap in a locking state and for unlocking the fuel cap in an unlocking state, and a movably arranged actuating element which is movable by means of an opening movement from a retracted position into an extended position such that the locking mechanism can be brought into the unlocking state by this opening movement of the actuating element.

It is provided hereby that the locking mechanism comprises a first locking element for arresting the fuel cap and a second locking element for arresting the actuating element. In other words, the actuating device, in particular a push-push actuator, can perform at least two functions. In particular, a first function is the opening of the fuel cap by the actuating element, wherein the fuel cap is flipped open, for example, by at least 5 mm or at least 10 mm or at least 15 mm and/or at least flipped open so far that an operator's hand can manually engage behind the fuel cap to be able to completely open the fuel cap manually. Preferably, the fuel cap can be brought into a partially open position by the opening movement of the actuating element, and preferably then brought into a complete open position by a manual actuation (for example, a tensile force on the fuel cap). A further function is in particular that when (and in particular only when) a fuel cap is closed, the push-push functionality (for example, the activation of the opening movement) can be blocked internally by the actuating device itself. This complete locking (that is, the change to the locking state) preferably occurs automatically when the central locking system of the vehicle is locked. The arresting of the fuel cap by the first locking element only prevents, for example, an opening of the fuel cap by a manual tensile force on the fuel cap, wherein the arresting by the second locking element in particular prevents the initiation and/or execution of the opening movement and thereby preferably brings about the locking state. Thus, a reliable locking can be made possible by the actuating device.

The vehicle can be, for example, a motor vehicle and/or a passenger vehicle and/or a truck, wherein the tank recess and/or the fuel cap are preferably arranged on the side region of the vehicle. A vehicle operator in this case to open the fuel cap carries out a manual actuation (for example, application of pressure) in particular with his hand on the fuel cap from the outside. The push-push function (push-push functionality) preferably makes it possible that the opening movement is performed in the case of manual pressure on the fuel cap or (indirectly via the fuel cap) on the actuating element in the retracted position of the actuating element, and a closing movement (and thus a change from the extended position into the retracted position and/or into a partial locking state) is brought about preferably in the extended position by a similar manual pressure (that is, at least by the same direction of the force application). This enables a very convenient actuation of the fuel cap by an operator.

It is provided in particular that both the first and second locking element arrest (lock) in the locking state, so that both the opening movement and a movement of the fuel cap is preventable by the locking mechanism. Thus, in particular, the push-push function is also prevented in the locking state. Further, a partial locking state can be provided, in which preferably only the first locking element arrests and thus the push-push function and the opening movement can be performed and can be initiated by an operator by the manual application of force to the fuel cap. Further, in particular in the unlocking state, both the arresting of the first locking element and of the second locking element is released or prevented, so that the push-push function and the closing movement can also be carried out. In particular, in the unlocking state the fuel cap is movable at least partially independently or relative to the actuating element. The push-push function preferably comprises at least the opening movement (which serves to open the fuel cap from the partial locking state) and the closing movement (which serves to close the fuel cap out of the unlocking state in the extended position). In other words, the movably arranged actuating element is preferably movable by means of the opening movement from the retracted position to the extended position such that the fuel cap can be brought into an open, unlocked state by this opening movement of the actuating element. Further, it is provided, for example, that the actuating element can be moved from the extended position into the retracted position by means of the closing movement such that the fuel cap can be brought into the closed and/or locked state by this closing movement. Thus, a convenient and reliable actuation of the fuel cap is possible.

Furthermore, it is optionally provided that the opening movement of the actuating element is, in particular exclusively, a curved movement of the actuating element from the retracted position into the extended position along a curved path. Due to the curved movement, that is, in particular also at least a partially circular and/or arcuate movement, both the fuel cap can be flipped open in particular by the opening movement and the arresting of the first locking element can be released. The opening movement can preferably take place completely rotation-free and/or free of rotational movement (that is, without rotatory and/or rotational movement about the particular longitudinal axis of the actuating element for unlocking). As a result, the space required for the actuating element in the actuating device can be reduced. In this regard, the opening movement is preferably a linear movement, which is guided in particular via a circular path. Preferably, the curved path is at least partially designed as a guide track for the actuating element within the actuating device (that is, for example, in a housing of the actuating device). In this case, the path may in particular have a convex shape with respect to the axis of rotation of the fuel cap and is preferably designed such that during the opening movement the fuel cap moves about its axis of rotation away from the actuating element. As a result, a particularly convenient manual operation of the fuel cap is possible.

It can be provided advantageously that a gear mechanism and/or a drive with at least one toothed segment are provided in the region of the guide track and/or in the actuating device, wherein the toothed segment is used for internal locking and deactivation of the push-push function in the locking state. This internal locking enables a fixation of the actuating element, for example, wherein the internal locking is initiated, for example, by the locking of a central locking system. It can be provided that when the central locking system and/or the internal locking are activated, the second locking element also locks the actuating element. Furthermore, the internal locking can also be disengaged preferably by deactivating the central locking system, wherein then, for example, the second locking element as well releases the actuating element. This enables secure locking and deactivation of the push-push function.

A further advantage can be achieved in the context of the invention if the opening movement and in particular the curved path are designed such that the fuel cap can be arrested by the first locking element in the retracted position of the actuating element, is successively releasable with the opening movement of the actuating element, and is completely releasable in the extended position of the actuating element to enable an unlocking and/or a complete manual opening of the fuel cap, and in particular is opened and/or flipped opened by the opening movement. It is provided in particular that the fuel cap can be arrested in the retracted position of the actuating element by the first locking element and is unlockable (releasable) in the extended position of the actuating element by the first locking element; that is, it can be brought into the unlocking state. Whereas the actuating element changes from the retracted position to the extended position by means of the opening movement, preferably, the first locking element can move successively away from the fuel cap. Conversely, it can preferably be provided that the first locking element successively approaches the fuel cap during the closing movement. It is preferably provided that, during this approaching, contacting of the first locking element with the fuel cap occurs, as a result of which the first locking element can be brought into engagement with a retaining element on the fuel cap. In particular, this approaching can be carried out and/or initiated by the manual application of force by an operator to the fuel cap. Thus, a convenient actuation of the push-push function can be carried out.

Moreover, it is advantageous if the actuating element can be operatively connected to the fuel cap such that the actuating element can be moved from the extended position into the retracted position and conversely by a manual application of force, in particular pressure, to the fuel cap. In this case, the fuel cap is preferably designed such that a manual application of force can be done by the operator's hand. The application of force or pressure can occur, for example, in the direction of the vehicle and/or in the direction of the actuating element. Thus, the actuating element can be directed reliably into the closing movement by the manual application of force.

According to an embodiment of the invention, it can be provided that the actuating element is always arrested in the retracted position, in particular in a first retracted position, by a control device and only in the locking state additionally by the second locking element, and preferably can be operatively connected to the fuel cap such that the actuating element is movable by the manual application of force to the fuel cap, preferably only outside the locking state, from the particularly first retracted position into an unstable release position, in particular as a second retracted position, and preferably the opening movement can be performed solely from the release position into the extended position. In other words, the arresting of the control device in the (first) retracted position can be deactivated preferably by the application of force to the fuel cap. In this case, the opening movement preferably occurs from the release position, which may be the second retracted position, into the extended position, and in particular the closing movement from the extended position to the (first) retracted position. The closing movement after it is carried out completely brings about in particular the arresting of the control device. A release movement preferably takes place further from the (first) retracted position to the release position and is guided in particular by the control device. For example, the actuating element assumes a stable position both in the (first) retracted position and in the extended position, wherein the release position is realized as an unstable position, however. In particular, the actuating element is spring-loaded by an energy storage element such that it automatically changes from the release position to the extended position. As a result, a particularly convenient and reliable push-push function is realized.

Furthermore, it is optionally possible in the context of the invention that the first locking element is fixedly and/or integrally connected to the actuating element and is preferably designed as a locking hook, and particularly preferably in the retracted position of the actuating element, the fuel cap can be arrested by a particularly frictional and/or positive engagement of the locking hook in a retaining element on the fuel cap. In particular, the first locking element can be designed monolithically with the actuating element and/or be connected unreleasably to the actuating element. The retaining element preferably has a shape complementary to the first locking element, so that the first locking element can be positively and/or frictionally engaged with the retaining element for reliable arresting. Further, the retaining element and/or the fuel cap preferably comprise a guide surface in order to guide the first locking element into the arresting position during the closing movement. Thus, a reliable arresting can be ensured.

It is conceivable further that the movement of the actuating element is controllable by a control device, wherein preferably the control device is fixedly connected to the actuating element and in particular has a control cam, in which a control device can be guided. The control cam is designed, for example, as a guide slot and preferably has a course such that the type of movement (for example, movement direction and/or movement speed) of the opening and/or closing movement can be controlled by the control cam. The control device is formed, for example, integrally and/or monolithically with the actuating element and/or connected fixedly or nonreleasably to the actuating element. It is conceivable, further, that the control device (the same as or similar to the actuating element) is guided in the guide track or another guide track of the actuating device and/or likewise performs a curved movement during the opening movement. Thus, for example, depending on an energy storage element and/or the application of force, the speed of the opening and/or closing movement can be controlled in order to improve still further the convenience during the actuation.

It may be possible further that the control device comprises a blocking element which, in the extended position of the actuating element, prevents arresting by the second locking element. The blocking element is formed, for example, integrally and/or monolithically with the actuating element and/or connected fixedly or nonreleasably to the actuating element. In this case, it is provided, for example, that the blocking element is brought into such a position by the opening movement that it blocks a movement of the second locking element in the arresting position. This can prevent the situation that when the vehicle locking system is activated, a still open fuel cap can no longer be closed.

Further, it can be provided within the scope of the invention that the second locking element is arranged movable by a drive in a housing of the actuating device, wherein the drive is electronically controllable, in particular as a function of a central locking system of the vehicle. The drive comprises, for example, an electric motor, in particular a DC motor, and is preferably controllable by the vehicle, in particular by a central locking system and/or vehicle electronics. Thus, the locking of the actuating device can be reliably controlled. In this case, the control device and/or the locking mechanism are installed at least partially movable in the housing.

In addition, it is conceivable within the scope of the invention that an energy storage element, in particular a spring element, is operatively connected to the actuating element and in particular is fixedly connected to the actuating element such that the opening movement of the actuating element is driven by the energy storage element. Alternatively, it may be provided that the energy storage element is not connected to the actuating element but, for example, only contacts the actuating element and/or only indirectly applies a force to the actuating element. The energy storage element preferably makes it possible that an automatic execution of the opening movement (in particular by the release of the arresting of the first locking element) can be initiated by a slight manual application of force in conjunction with the control device to bring the actuating element from the retracted position to the release position. The automatic opening movement is then preferably achieved in that the energy storage element releases the stored energy and thus brings about the opening movement. Further, it is preferably achieved, in particular by the closing movement, that the energy storage element again absorbs and stores energy for carrying out the closing movement due to the manual application of force. As a result, the convenience during the actuation is increased further.

It can be provided preferably that a housing of the actuating device is provided, wherein the actuating element is arranged, preferably at least partially, and/or a control device, preferably completely, and/or an energy storage element, preferably completely, and/or the second locking element, preferably completely, within the housing. In particular, the actuating device with the locking mechanism thus forms a common component. As a result, the space required for the actuating device can be optimized in that no external elements for the locking mechanism are necessary. Further, in particular in the (first and/or second) retracted position, the actuating element is arranged completely within the housing and in the extended position only partially within the housing.

Advantageously, it can be provided in the invention that a housing is provided which has at least one connector, in particular a latching connecting means, for connection to the tank recess. Thus, a particularly simple and quick installation of the actuating device is possible. It can be provided in this regard that the actuating device is arranged and/or fixed by the connector to the tank recess, in particular by means of clips and/or latching connector and/or the like. The latching connector can be connected, for example, with counter-latch connector of the tank recess for mounting.

It can also be provided that at least one sealing element is provided which preferably seals off watertight an opening between the actuating element and the housing, preferably at least partially from the outside. The sealing element is designed, for example, as a bellows, and in particular forms an elastically deformable seal. It is conceivable that the sealing element is fixedly connected to the housing at a first side and/or is connected to the actuating element at a second side, in particular opposite the first side. This connection can preferably be made such that the sealing element unfolds during an opening movement and folds together during a closing movement. In this way, a secure seal and functioning of the actuating device can be ensured.

The actuating device can comprise an integrated position detection device for detecting the position of the actuating element. The position detection device may comprise, for example, at least one electronic component, in particular a microswitch and/or a microprocessor and/or a microcontroller and/or a reed switch. As a result, the position of the actuating element can be reliably detected. Further, it can be provided that the position detection device is electrically connected to a vehicle electronics and/or a central locking system, in order to prevent a change in the locking state when the actuating element is extended (in the extended position).

The subject of the invention is likewise a method for actuating a fuel cap movably arranged on a vehicle for concealing a tank recess of the vehicle, comprising a locking mechanism for locking the fuel cap in a locking state and for unlocking the fuel cap in an unlocking state, and a movably arranged actuating element which is moved by means of an opening movement from a retracted position into an extended position such that the locking mechanism is brought into the unlocking state by this opening movement of the actuating element. It is provided hereby that the locking mechanism comprises a first locking element for arresting the fuel cap and a second locking element for arresting the actuating element. Thus, the method of the invention provides the same advantages as described in detail with reference to an actuating device of the invention. Furthermore, the method of the invention may be suitable for operating an actuating device of the invention.

Likewise, a subject of the invention is an actuation system. In this case, it is provided that the actuation system comprises a tank recess and an actuating device arranged on and/or attached to the tank recess, in particular an actuating device of the invention. Thus, the actuation system of the invention provides the same advantages as are described in detail with reference to a method of the invention and/or an actuating device of the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
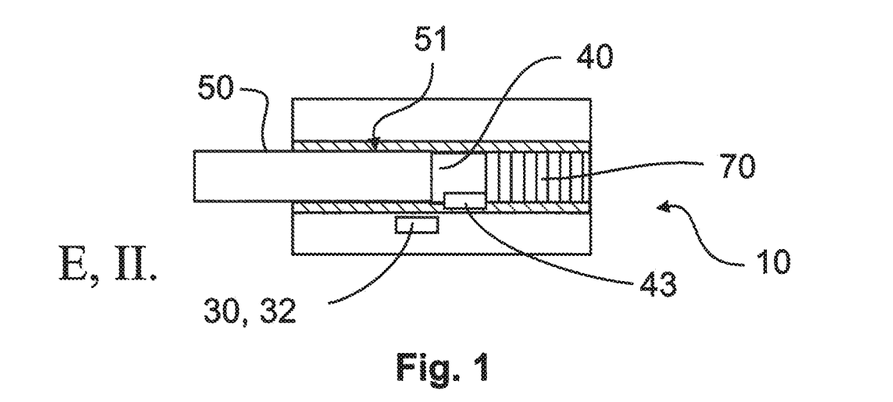
FIGS. 1 to 3 are schematic diagrams of the actuating device of the invention for visualizing the retracted, extended, and release position.
Figure 2:
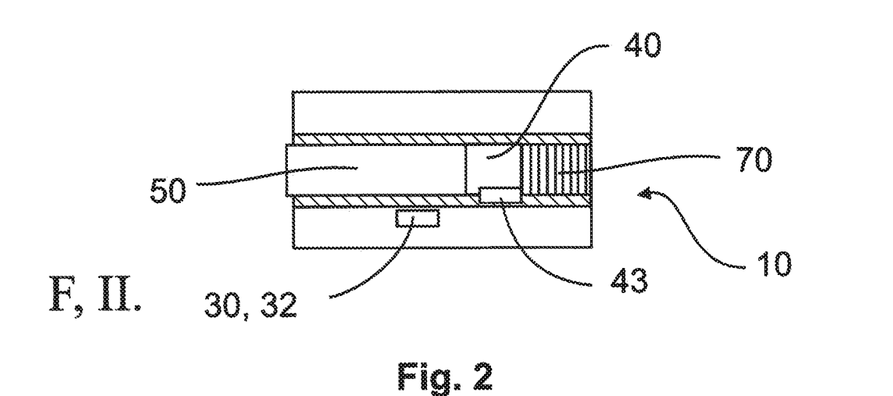
Figure 3:
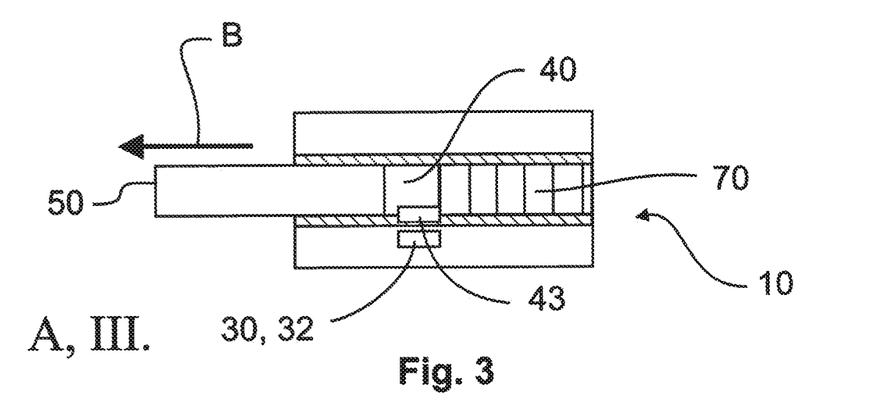

The basic process for changing from a retracted position E in FIG. 1 via a release position F in FIG. 2 to an extended position A in FIG. 3 for an actuating element 50 of an actuating device 10 of the invention is visualized in FIGS. 1 to 3 in a schematic sectional diagram in a side view. Actuating element 50 can be moved from the stable retracted position E to an unstable release position F by pressure from the outside, in particular a manual application of force (in a direction opposite to the arrow B in FIG. 3). If this force effect is then at least partially eliminated, opening movement B is performed due to energy storage element 70, in particular a spring element 70. In so doing, actuating element 50 moves outward in the direction of arrow B into extended position A. The extended position A is also a stable position, wherein the closing movement can be performed by a renewed manual force effect in the direction opposite to arrow B (i.e., opposite to opening movement B). Actuating element 50 can again be brought into retracted position E by the closing movement. A control and/or arresting to assume the stable positions occur thereby by a control device 40. Further, a blocking element 43, which prevents arresting in the extended position A by a second locking element 32 of a locking mechanism 30, is disposed on control device 40. For opening movement B, actuating element 50 is guided in a guide track 51 of actuating device 10.

Figure 4:
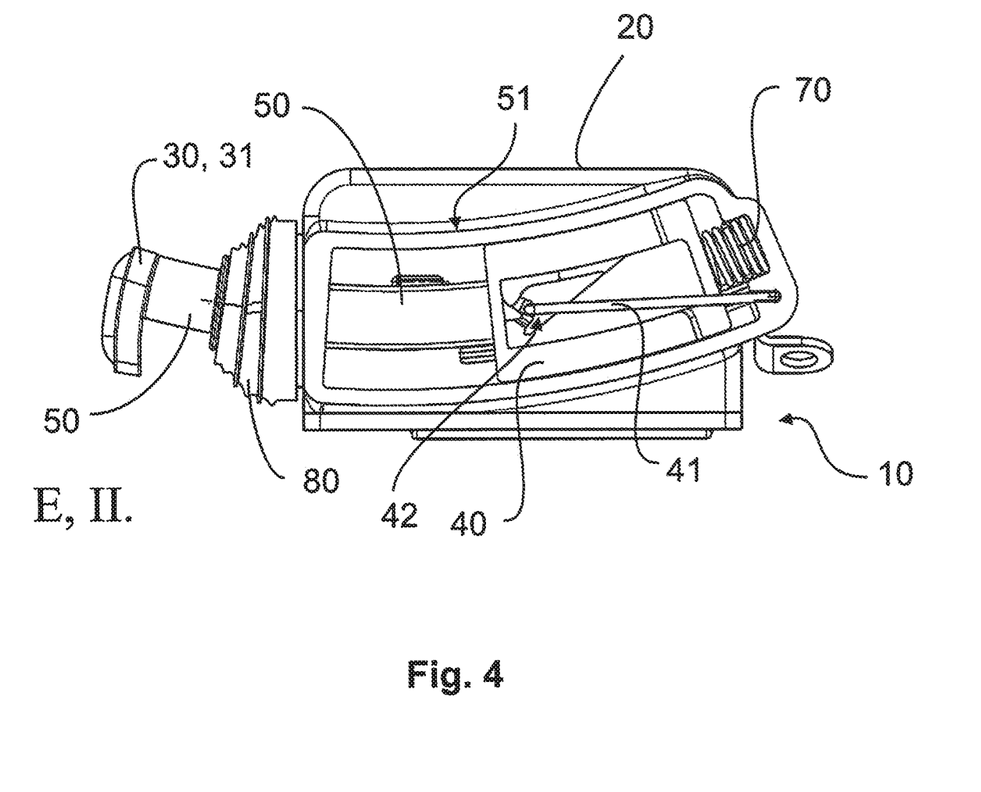
FIG. 4 and FIG. 5 are schematic diagrams of an actuating device of the invention in a top plan view.
Figure 5:
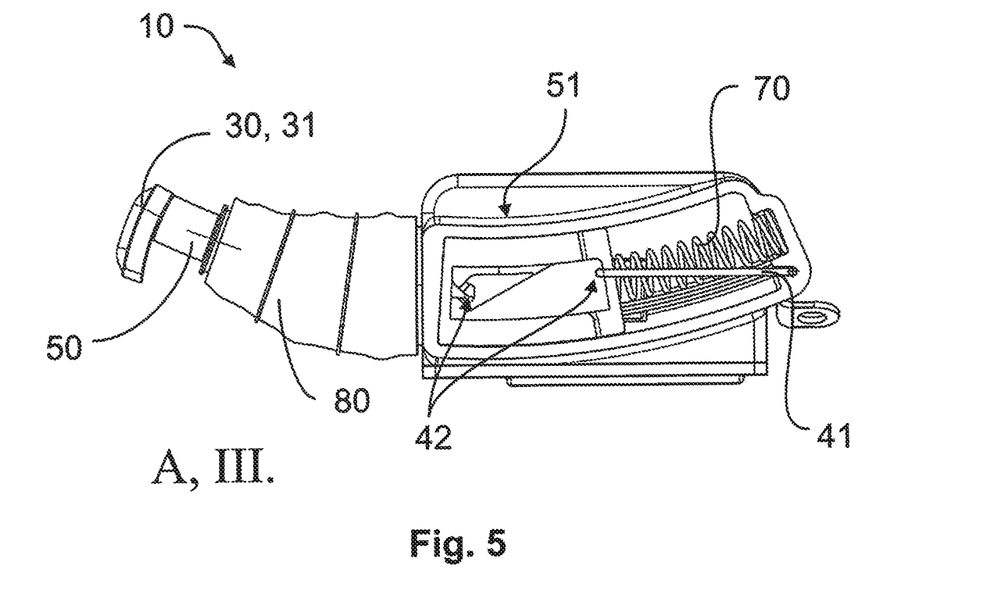

FIGS. 4 and 5 show a top plan view of actuating device 10 of the invention. In this case, retracted position E of actuating element 50 is shown in FIG. 4 and its extended position A in FIG. 5. It is shown further that, for example, a sealing element 80 is disposed on actuating element 50 to protect against penetrating moisture. Further, the curvature of guide track 51 is clearly visible, as a result of which actuating element 50 can carry out a curved opening movement B. To control the movement of actuating element 50, control device 40 is further illustrated in greater detail in FIGS. 4 and 5. Thus, a control device 41 is shown, which is movably guided in a control cam 42 of control device 40. Control device 41 is, for example, fixed to a housing 20 of actuating device 10.

Figure 6:
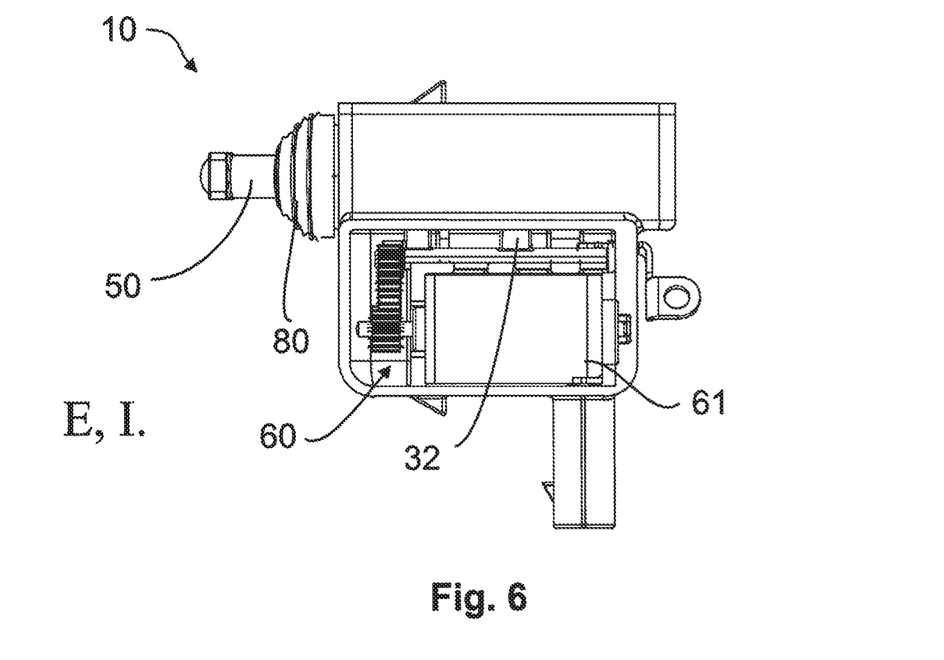
FIG. 6 and FIG. 7 are schematic diagrams of an actuating device of the invention in a side view.
Figure 7:
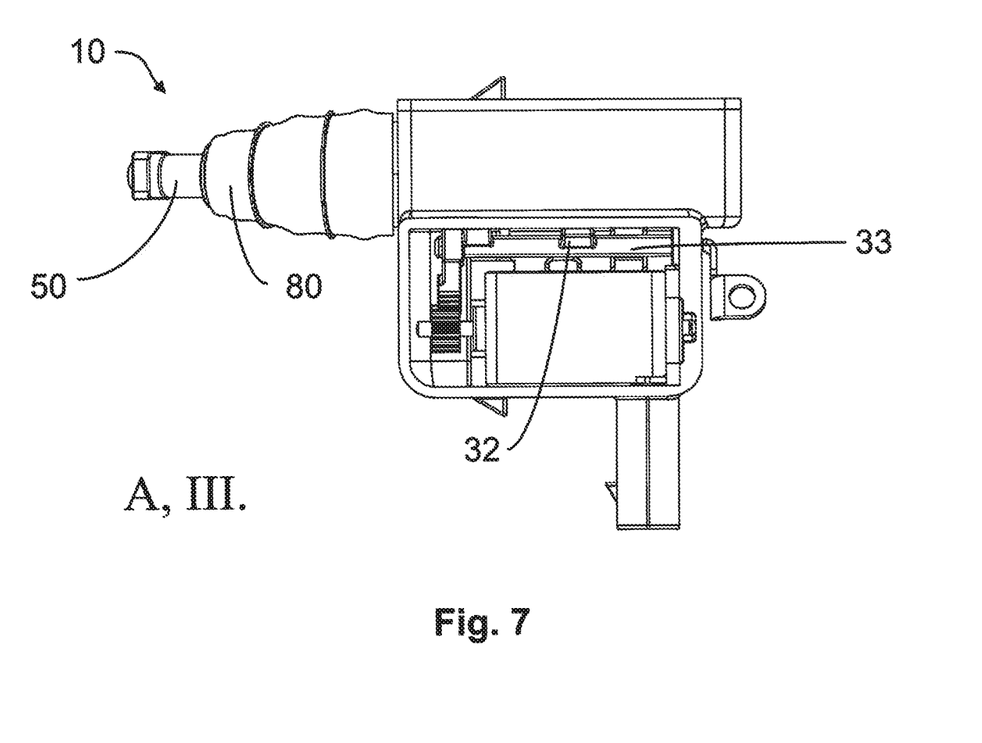

FIG. 6 shows the retracted position E, wherein actuating device 10 of the invention is in a locking state I. In locking state I, opening movement B is prevented by a second locking element 32. Second locking element 32 can be activated, for example, by a drive 60, which comprises a motor 61 with an interface 62. If there is an activation of second locking element 32 for arresting in extended position A, as shown in FIG. 7, the arresting and thus locking state I are prevented by blocking element 43. Thus, actuating device 10 remains in extended position A in the unlocked state or unlocking state III. In retracted position E, however, blocking element 43 is moved such that an arresting by second locking element 32 is possible. If only first locking element 31 arrests fuel cap 2 in retracted position E, then actuating device 10 of the invention is in a partial locking state II, as shown, for example, in FIGS. 1 and 2.

Figure 8:
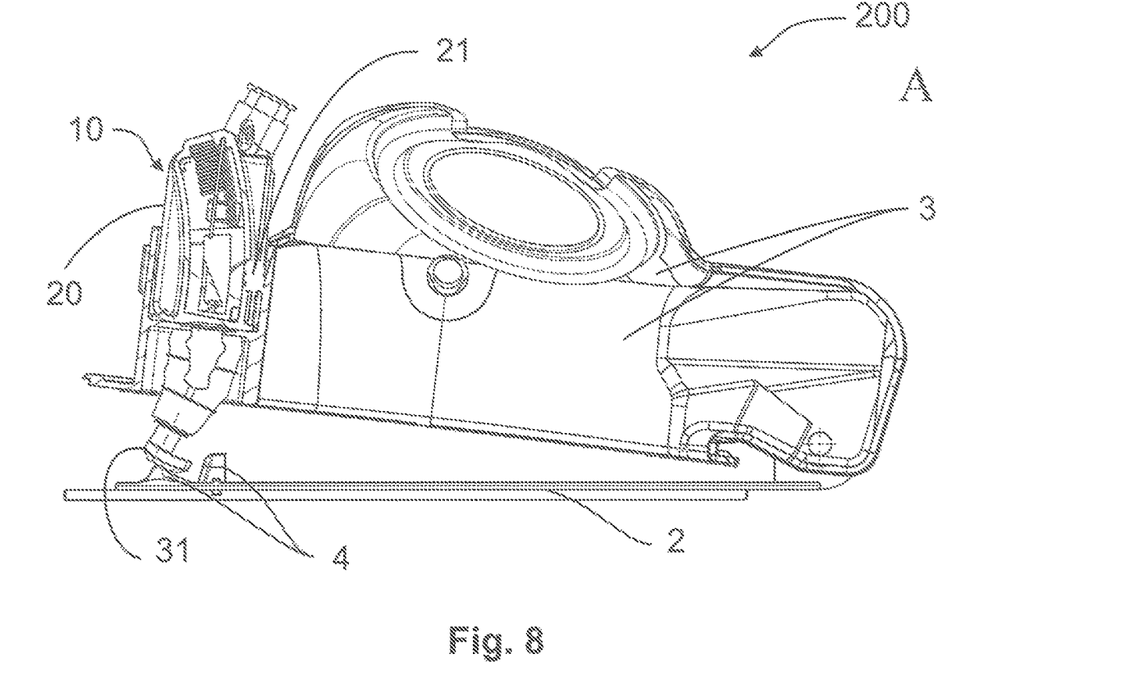
FIG. 8 and FIG. 9 are schematic diagrams of an actuation system of the invention.
Figure 9:
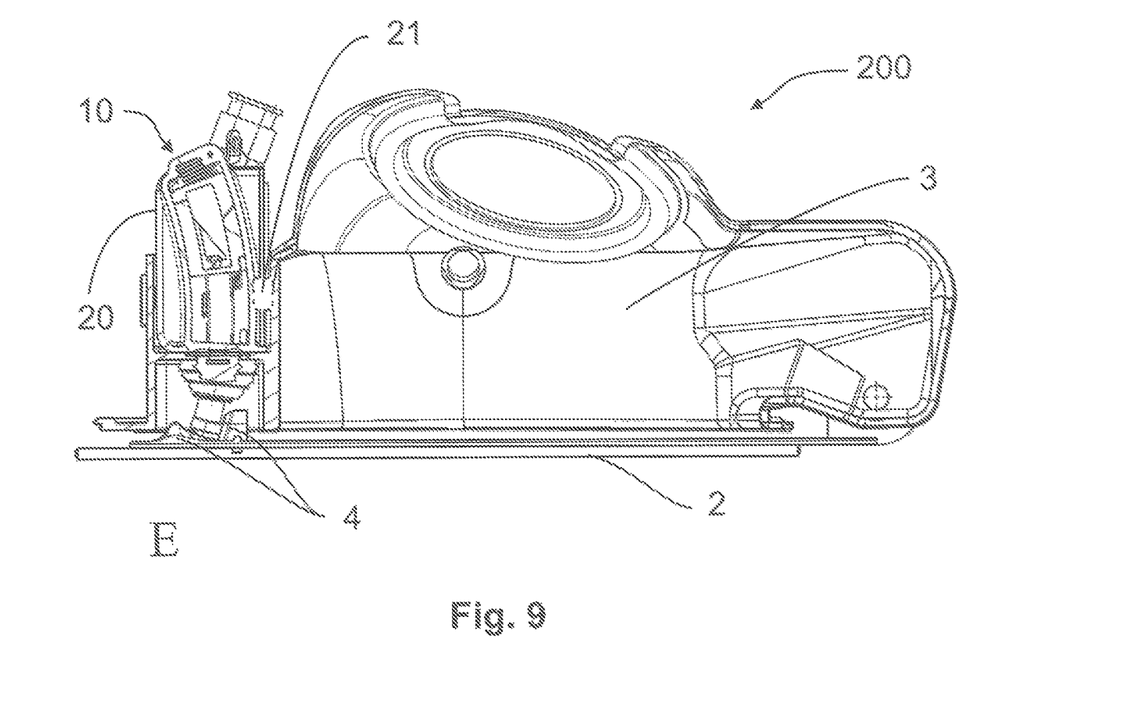

FIGS. 8 and 9 show a schematic top plan view of an actuation system 200 of the invention, wherein an actuating device 10 of the invention attached to a tank recess 3 is shown. Furthermore, a fuel cap 2 can be seen, which has a retaining element 4 with a guide for first locking element 31. It can be clearly seen that in retracted position E (FIG. 9) first locking element 31 is arrested by an engagement in retaining element 4 and in FIG. 8 in contrast it is released in extended position A. As a result, this release necessarily occurs by opening movement B, by which first locking element 31 is successively removed from retaining element 4.

Figure 10:
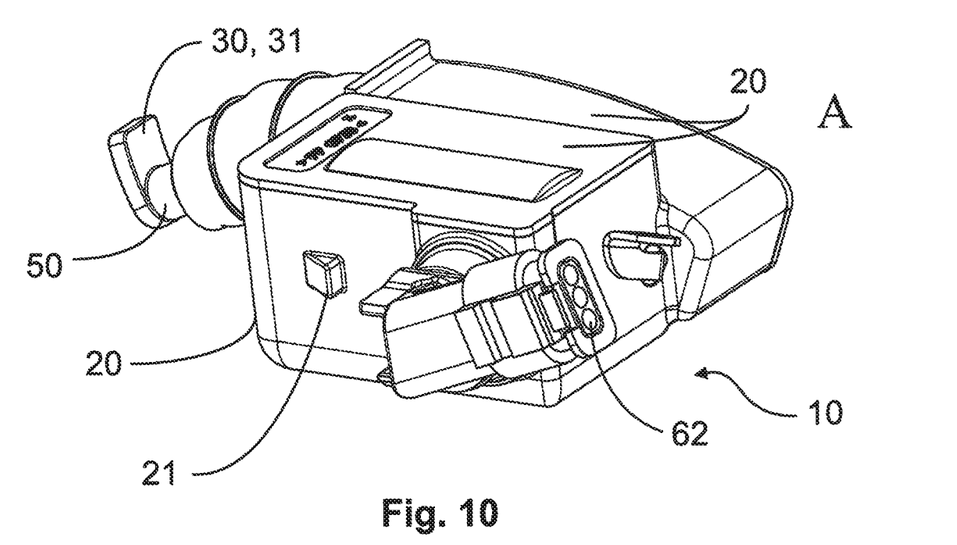
FIG. 10 is a schematic perspective view of an actuating device of the invention.

Furthermore, a connector 21 of a housing 20 of an actuating device 10 of the invention is shown by way of example in FIGS. 8 to 10. It can be designed, for example, as a latching connector.

Figure 11:
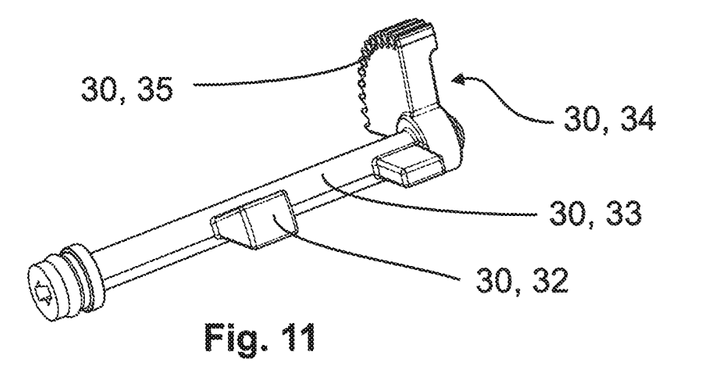
FIG. 11 is a diagram of a locking shaft.

FIG. 11 schematically shows a locking shaft 33 of a locking mechanism 30 of an actuating device 10 of the invention. In this case, a second locking element 32 and a gear mechanism 34 with a toothed segment 35 can be seen. Toothed segment 35 is used for internal locking, which brings about a prevention of opening movement B.

Figure 12:
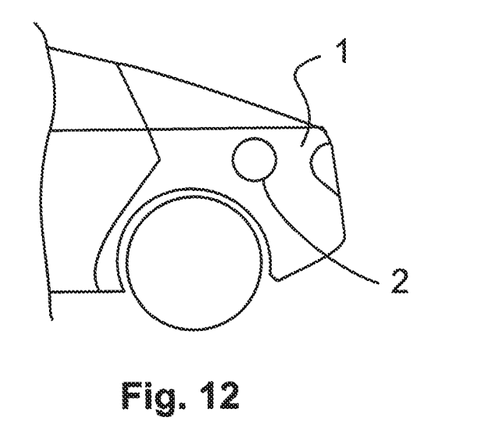
FIG. 12 is a schematic diagram of a fuel cap.

FIG. 12 shows the arrangement of a fuel cap 2 in a vehicle 1. The arrangement is such that a manual force effect from the outside on fuel cap 2 to actuate actuating device 10 of the invention can be carried out.

Figure 13:
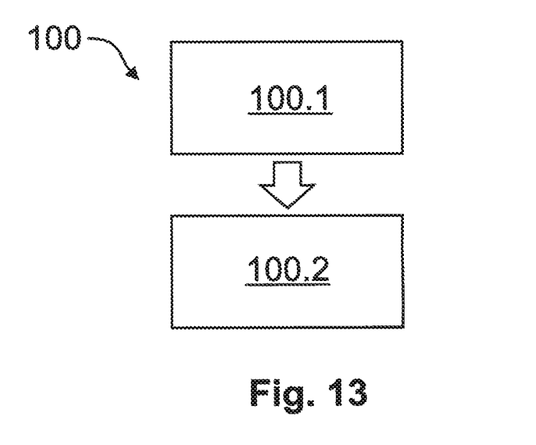
FIG. 13 is a schematic diagram for visualizing a method of the invention.

FIG. 13 schematically shows a method 100 of the invention. In this case, according to a first method step 100.1, an arresting occurs from an unlocking state III by a first locking element 31. As a result, actuating device 10 of the invention changes into a partial locking state II. Subsequently, in accordance with a second method step 100.2, an arresting occurs by a second locking element 32, as a result of which actuating device 10 of the invention changes to a locking state I.

The above explanation of the embodiments describes the present invention solely in the context of examples. Of course, individual features of the embodiments, if technically feasible, can be combined freely with one another without departing from the scope of the present invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An actuating device for a fuel cap movably arranged on a vehicle for concealing a tank recess of the vehicle, the actuating device comprising:
    a locking mechanism for locking the fuel cap in a locking state and for unlocking the fuel cap in an unlocking state; and
    a movably arranged actuating element that is movable via an opening movement from a retracted position into an extended position such that the locking mechanism is adapted to be brought into the unlocking state by this opening movement of the actuating element,
    wherein the locking mechanism comprises a first locking element for arresting the fuel cap and a second locking element for arresting the actuating element, and
    wherein the actuating element is arcuate shaped such that the opening movement of the actuating element is a curved movement of the actuating element, without rotation of the actuating element, from the retracted position into the extended position along a curved path.

2. The actuating device according to claim 1, wherein the opening movement and the curved path are designed such that the fuel cap: is adapted to be arrested in the retracted position of the actuating element by the first locking element; is successively releasable with the opening movement of the actuating element; and is completely releasable in the extended position of the actuating element to enable an unlocking and/or a complete manual opening of the fuel cap and is opened and/or flipped open by the opening movement.

3. The actuating device according to claim 1, wherein the actuating element is operatively connected to the fuel cap such that the actuating element is moved from the extended position into the retracted position and conversely by a manual application of force or pressure to the fuel cap.

4. The actuating device according to claim 1, wherein the actuating element is always arrested in the retracted position in a first retracted position by a control device and only in the locking state additionally by the second locking element, and is operatively connected to the fuel cap such that the actuating element is movable by the manual application of force to the fuel cap only outside the locking state from the first retracted position into an unstable release position as a second retracted position, and wherein the opening movement is performed solely from the release position into the extended position.

5. The actuating device according to claim 1, wherein the first locking element is fixedly and/or integrally connected to the actuating element and is designed as a locking hook, and wherein, in the retracted position of the actuating element, the fuel cap is arrested by a frictional and/or positive engagement of the locking hook in a retaining element on the fuel cap.

6. The actuating device according to claim 1, wherein the movement of the actuating element is controllable by a control device, wherein the control device is fixedly connected to the actuating element and has a control cam, in which a control lever is guided.

7. The actuating device according to claim 6, wherein the control device comprises a blocking element which, in the extended position of the actuating element prevents arresting by the second locking element.

8. The actuating device according to claim 1, wherein the second locking element is arranged movable by a drive in a housing of the actuating device, wherein the drive is electronically controllable as a function of a central locking system of the vehicle.

9. The actuating device according to claim 1, wherein an energy storage element or a spring element is operatively connected to the actuating element and is fixedly connected to the actuating element such that the opening movement of the actuating element is driven by the energy storage element.

10. The actuating device according to claim 1, wherein a housing of the actuating device is provided, wherein the actuating element is arranged, at least partially, in the housing and a control device, an energy storage element, and the second locking element are arranged completely within the housing.

11. The actuating device according to claim 1, wherein a housing is provided which has at least one connector or a latching connecting for connection to the tank recess.

12. A method for actuating a fuel cap movably arranged on a vehicle for concealing a tank recess of the vehicle, the method comprising:
    providing a locking mechanism for locking the fuel cap in a locking state and for unlocking the fuel cap in an unlocking state; and
    providing a movably arranged arcuate shaped actuating element, which is moved by an opening movement from a retracted position into an extended position such that the locking mechanism is brought into the unlocking state by this opening movement of the actuating element,
    wherein the locking mechanism comprises a first locking element for arresting the fuel cap and a second locking element for arresting the actuating element, and
    wherein the opening movement of the actuating element is a curved movement of the actuating element, without rotation of the actuating element, from the retracted position into the extended position along a curved path.

13. An actuation system comprising:
    a fuel cap;
    a tank recess; and
    an actuating device according to claim 1, which is arranged on the tank recess.

14. The actuating device according to claim 1, wherein the first locking element is integral with the actuating element and the second locking element is integral with a rotatable locking shaft, such that the second locking element rotates about an axis of the rotatable locking shaft.

15. The method according to claim 12, wherein the first locking element is integral with the actuating element and the second locking element is integral with a rotatable locking shaft, such that the second locking element rotates about an axis of the rotatable locking shaft.

\* \* \* \* \*